(12) United States Patent
Ziech

(10) Patent No.: US 7,306,536 B2
(45) Date of Patent: Dec. 11, 2007

(54) TANDEM AXLE SYSTEM

(75) Inventor: James F. Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 28 days.

(21) Appl. No.: 11/143,223

(22) Filed: Jun. 2, 2005

(65) Prior Publication Data

US 2006/0276297 A1    Dec. 7, 2006

(51) Int. Cl.
*F16H 48/06* (2006.01)
*B62D 61/10* (2006.01)

(52) U.S. Cl. .................... 475/221; 475/222; 180/24.09

(58) Field of Classification Search ............... 475/202, 475/206, 221, 222, 225, 223; 180/247–9, 180/24.04, 24.09, 24.1, 24.11, 24.12
See application file for complete search history.

(56) References Cited

U.S. PATENT DOCUMENTS

| | | | |
|---|---|---|---|
| 1,791,138 A | 2/1931 | Masury | |
| 1,856,748 A | 5/1932 | Davis | |
| 2,699,075 A * | 1/1955 | Buckendale | 180/24.09 |
| 2,954,704 A * | 10/1960 | Saari | 74/466 |
| 3,146,842 A * | 9/1964 | Nelson et al. | 180/24.09 |
| 3,572,154 A * | 3/1971 | Bartolomucci | 74/424 |
| 4,733,578 A * | 3/1988 | Glaze et al. | 475/246 |
| 4,887,487 A * | 12/1989 | Mayfield | 475/74 |
| 6,514,169 B2 * | 2/2003 | Turner et al. | 475/222 |
| 6,852,058 B2 * | 2/2005 | Oates et al. | 475/221 |
| 6,863,634 B2 * | 3/2005 | Holman et al. | 475/221 |
| 6,957,710 B2 | 10/2005 | Oates | |
| 2002/0083787 A1 * | 7/2002 | Silvagi | 74/466 |

* cited by examiner

*Primary Examiner*—Roger Pang
(74) *Attorney, Agent, or Firm*—Marshall & Melhorn LLC

(57) ABSTRACT

A tandem axle system for vehicle having an optimized inter-axle driveline is depicted and described. The system has a forward drive axle system having a forward pinion gear drivingly connected to a drive side of a forward portion of a forward ring gear. The system also has a rear drive axle system having a rear pinion gear drivingly connected to a drive side of a rear portion of a rear ring gear. An inter-axle driveline connects the forward drive axle system with the rear drive axle system.

15 Claims, 5 Drawing Sheets

TANDEM AXLE SYSTEM

FIELD OF THE INVENTION

The present invention relates to a tandem axle system for vehicles. More particularly, the present invention relates to a tandem axle system for vehicles having an optimized inter-axle driveline between a forward drive axle system and a rear drive axle system.

BACKGROUND OF THE INVENTION

Those skilled in the art know that drive is provided for a vehicle such as a class 8 truck from a forward rear drive axle to a rear rear drive axle of tandem axles through an inter-axle driveline. Typical tandem axles have high inter-axle driveline cardan joint angles due to the high position of the forward axle output shaft joint and the low position of the rear axle input joint. High inter-axle driveline cardan joint angles in typical tandem axles can also be attributed to the short distance between the forward axle output joint and the rear tandem axle input joint. Those skilled in the art know that high inter-axle driveline carden joint angles are generally undesirable since the noise and vibration of the joints increase as the angles increase. The low position of the rear axle input joint also undesirably reduces the ground clearance of the inter-axle driveline.

Based on the above, it can be appreciated that a long inter-axle driveline is desirable since such a driveline will reduce the angles. Therefore, if the standout dimension, which is the distance between the centerline of the axle shaft and the front of the rear axle input shaft, can be reduced, a longer inter-axle driveline can be accommodated in the tandem axle system.

Various prior art inventions have tried to address these disadvantages of tandem axles. For example, U.S. Pat. No. 1,856,748 (hereinafter "the '748 patent") provides for a driving mechanism designed to eliminate excessive angles in the universal joints of vehicles under normal driving conditions. FIG. 2 of the '748 patent depicts a propeller shaft e driving a universal joint f. Joint f is connected to a first differential mechanism f1. The joint f supplies power to f1 which apportions that power between axles b1 and c1. A hyperbolical spiral hypoid driving pinion f2 supplies a portion of the power to the ring gear b4 while a second similar driving hypoid pinion f3 supplies the remaining power to the ring gear c4. It should be noted that both the f2 and f3 driving hypoid pinions are operating on the coast side of the respective b4 and c4 ring gears which is known to be the undesirable weak side of the gear tooth in the '748 patent.

A shaft g connects the differential housings b3 and c3. To align the shaft g with propeller shaft e, the axis of the forward driving pinion f2 falls above the axis of the shaft b1 while the axis of pinion f3 is below the axis of shaft c1. It should be noted that the rear axle input is below center and as such does not provide good ground clearance for the rear of inter-axle driveline g.

According to the '748 patent, this design aligns the axis of pinions f2 and f3 with one another and with the shafts e and g. The pinion f3 drives from the rear side of the ring gear c4 and the forward pinion f2 drives from the forward side of the ring gear b4.

U.S. Pat. No. 1,791,138 (hereinafter "the '138 patent") provides for a dual axle drive having ring gears f1 and f3 mounted on opposite sides of the transmission shaft x, as best seen in FIG. 6. The hypoid pinion f meshes with the ring gear f1 rearward from the live axle a3 while the hypoid pinion f2 meshes with the ring gear f3 forward of the live axle b3.

FIG. 3 of the '138 patent depicts the forward pinion on the rear side of the forward ring gear and the rear pinion on the forward side of the rear ring gear. The '138 patent also teaches that the rear pinion is located above the center of the rear ring gear. The forward pinion is also above the center of the front ring gear. It should be noted that the forward drive hypoid pinion f is operating on the desirable stronger side of ring gear f1 but the rear drive hypoid pinion f2 is operating on the undesirable weak coast side of ring gear f3. Additionally, the placement of the inter-axle power divider differential d1, d2, d3 components and the forward axle pinion f to the rear of the forward axle results in an undesirably short inter-axle driveline.

Despite trying to address some of the problems with tandem axles, the representative prior art discussed above can be improved. Specifically, it would be advantageous to optimize the inter-axle driveline by minimizing the cardan joint angles and improving the inter-axle driveline ground clearance.

SUMMARY OF THE INVENTION

The present invention is a tandem axle system having a forward drive axle system having a forward hypoid gear set comprising a forward pinion gear drivingly connected to a drive side of a forward portion of a forward ring gear. The system also has a rear drive axle system having a rear hypoid gear set comprising a rear pinion gear drivingly connected to a drive side of a rear portion of a rear ring gear. An inter-axle driveline connects the forward drive axle system with the rear drive axle system.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
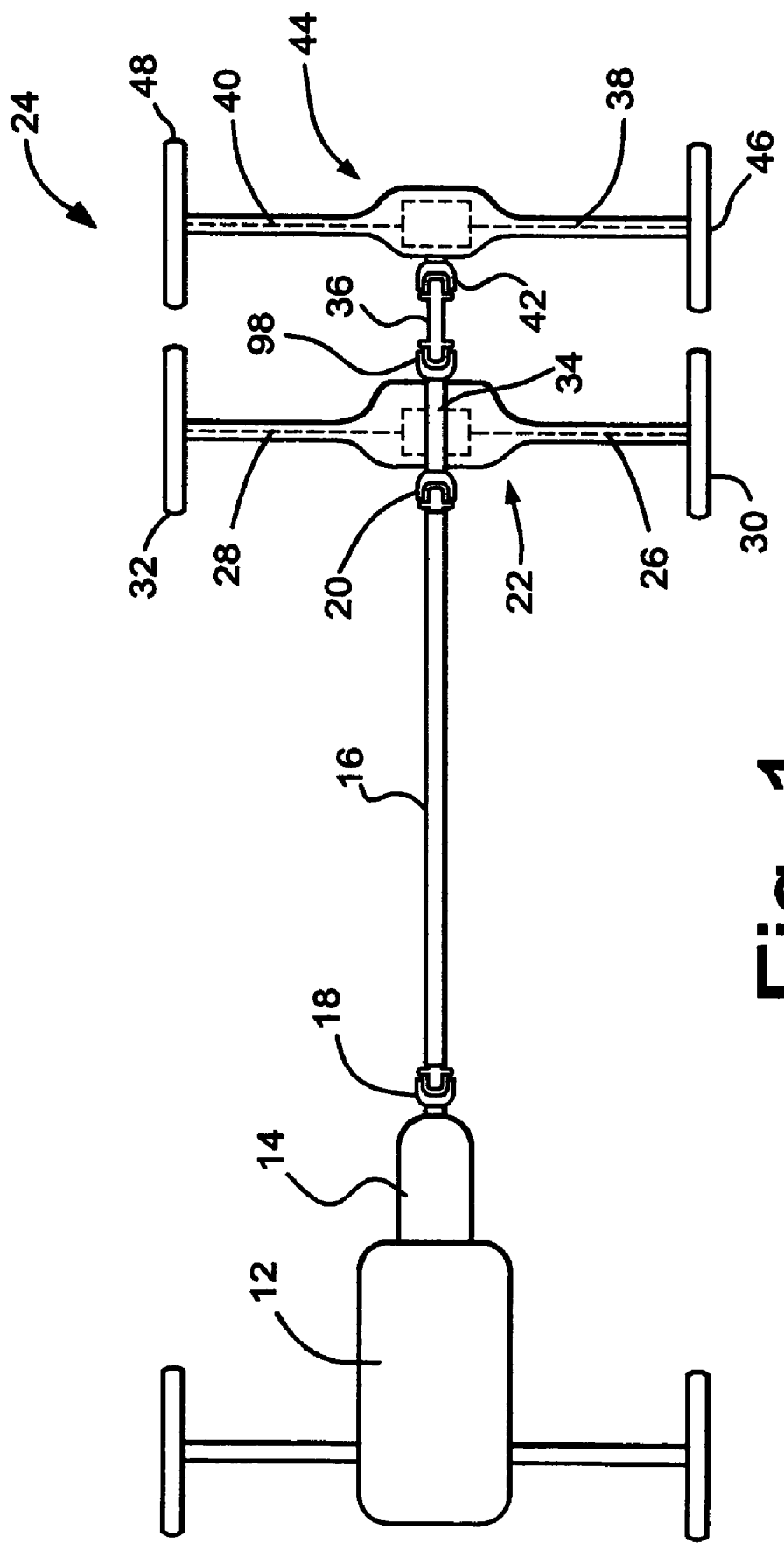
FIG. 1 is a schematic plan view of a vehicle having a forward axle and tandem rear axles of the present invention.

Referring now to FIG. 1, a vehicle 10 having an engine 12 drivingly connected to a change speed transmission 14 is depicted. A shaft 16 is connected to the output portion of the transmission 14, such as by a single cardan universal joint yoke 18 as known to those skilled in the art, and is drivingly connected to an input, such as by a single cardan U-joint yoke 20, also as known to those skilled in the art, of a forward drive axle assembly 22 of tandem axles 24.

As described in more detail below, drive is transmitted from the yoke 20 to a first forward drive axle 26 and a second forward drive axle 28 of a forward drive axle assembly 22. The first forward drive axle 26 provides drive to at least one wheel 30 and associated tire (not shown) and the second forward drive axle provides drive to at least one wheel 32 and associated tire (not shown), as known to those skilled in the art.

A through shaft, numbered generically with reference number 34, extends through the forward drive axle system 22 and is drivingly connected to an inter-axle driveline 36. The inter-axle driveline 36 connects the forward drive axles 26, 28 with a first rear drive axle 38 and a second rear drive axle 40. More specifically, the inter-axle driveline 36 transmits drive from a single cardan U-joint yoke 98 output to an input, such as a single cardan U-joint yoke 42, as known to those skilled in the art, for the rear drive axles 38, 40. The rear drive axles 38, 40 are part of a rear drive axle assembly 44. The first rear drive axle 38 provides drive to at least one wheel 46 and associated tire (not shown) and the second rear drive axle 40 provides drive to at least one wheel 48 and associated tire (not shown), as known to those skilled in the art.

Figure 2:
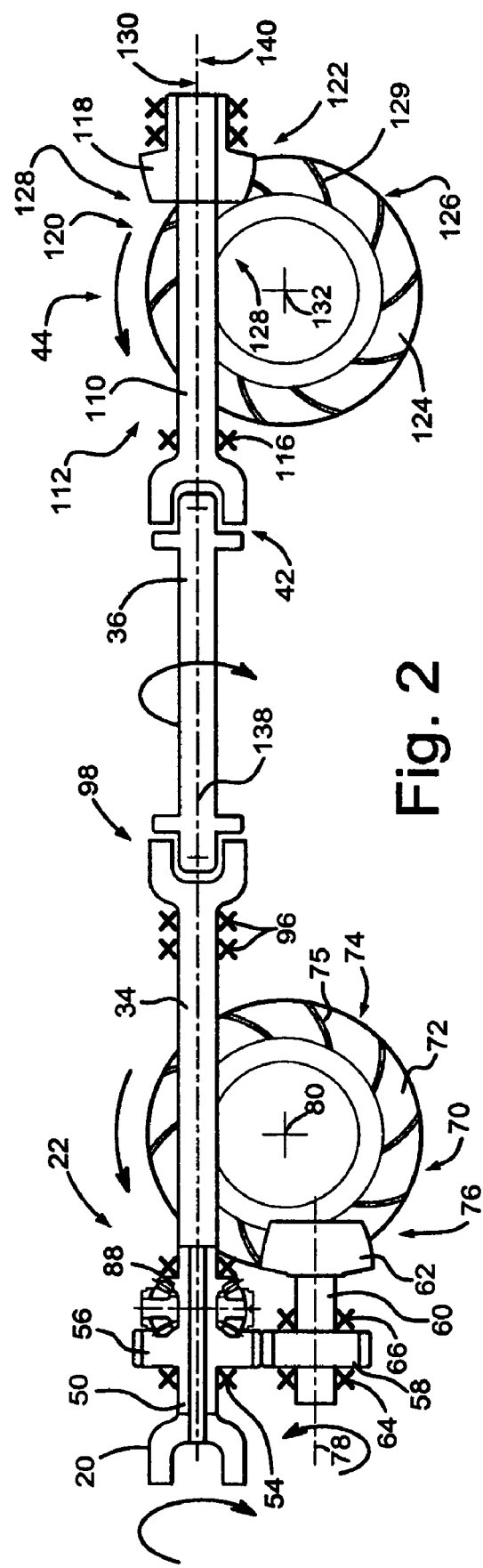
FIG. 2 is a schematic side view of a forward drive axle system and a rear drive axle system of the tandem rear axles of FIG. 1.
Figure 3:
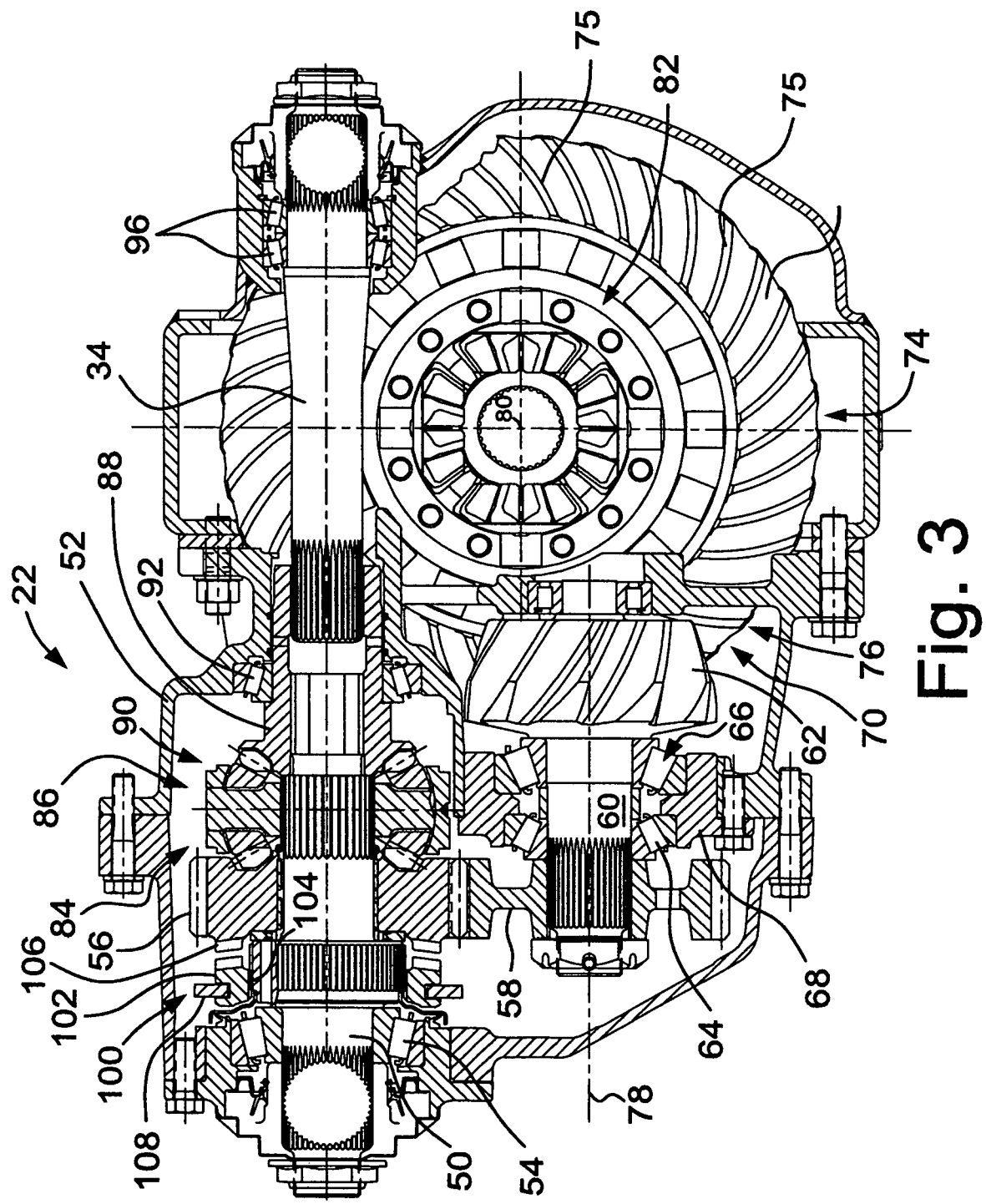
FIG. 3 is a side view of a forward drive axle system of the present invention.

Referring now to FIGS. 2 and 3, a portion of yoke 20 is depicted as being connected to an input shaft 50 of the forward drive axle assembly 22. Those skilled in the art will appreciate that the forward drive axle assembly 22 is located within a forward drive axle assembly housing 52, shown only in FIG. 3. The input shaft 50 is mounted for rotation with respect to the forward drive axle assembly housing 52 on at least one bearing 54.

As seen in both FIGS. 2 and 3, a helical side gear 56 is secured to and rotates with the input shaft 50. The helical side gear 56 is in mesh with a pinion helical gear 58. The pinion helical gear 58 is attached to the pinion shaft 60 of a forward pinion gear 62. The pinion shaft 60 is mounted for rotation with respect to the forward drive axle housing 52 with at least one bearing 64. The forward pinion gear 62 is also supported for rotation with a bearing 66. The bearing 66 may be supported by a bolt-on bearing cage 68.

The forward pinion gear 62 is part of a forward hypoid gear set 70 also comprising a forward ring gear 72. As shown in FIGS. 2 and 3, the forward pinion gear 62 is preferably in mesh with a drive side 74 of the forward ring gear 72. Those skilled in the art will appreciate that the drive side 74 of the forward ring gear 72 comprises convex ring gear teeth 75. Only a representative sample of the convex ring gear teeth 75 are depicted in FIG. 2. Meshing the forward pinion gear 62 with the convex ring gear teeth 75 on the drive side 74 of the forward ring gear 72 is a much stronger mesh than if the pinion gear 62 was meshed with the coast side of the gear 72. It is also preferred that the forward pinion gear 62 is meshed with a forward portion 76 of the forward ring gear 72 and that an axis of rotation 78 of the forward pinion gear 62 is located below an axis of rotation 80 of the ring gear 72.

The forward ring gear 72 is connected to the first and second forward drive axles 26, 28 with a wheel differential 82, which is partially shown in FIG. 3, for providing rotational drive to the axles 26, 28.

Referring to FIGS. 2 and 3, the helical side gear 56 is depicted as being in mesh with one side 84 of an inter-axle differential 86. The inter-axle differential 86 is mounted for rotation with the input shaft 50. At least one output side gear 88 is in mesh with the other side 90 of the inter-axle differential 86. At least one bearing 92 is located between the output side gear 88 and the forward drive axle system housing 52 to permit the output side gear 88 to rotate with respect to the housing 52.

The output side gear 88 is connected to rear output shaft 34. The rear output shaft 34 extends rearwardly toward the back of the housing 52 above the rotational axis 80 of the forward ring gear 72. At least one bearing 96 supports the rear output shaft 34 for rotation with respect to the housing 52. A yoke 98 connects the rear output shaft 34 with the inter-axle driveline 36, as shown in FIG. 2.

The forward drive axle assembly 22 may also comprise an inter-axle differential lockout clutch 100, as shown in FIG. 3. The lockout clutch 100 comprises an axially moveable clutch gear 102 attached to the input shaft 50 with a plurality of splines 104. The helical side gear 56 has a complementary clutch gear 106 to the axially moveable clutch gear 102. The axially moveable clutch gear 102 is connected to a shift fork 108 that moves clutch gear 102 into and out of engagement with clutch gear 106 on the helical side gear 56. The inter-axle differential lock out clutch 100 selectively allows the forward drive axle assembly 22 and the rear drive axle assembly 44 to be drivingly locked together.

Figure 4:
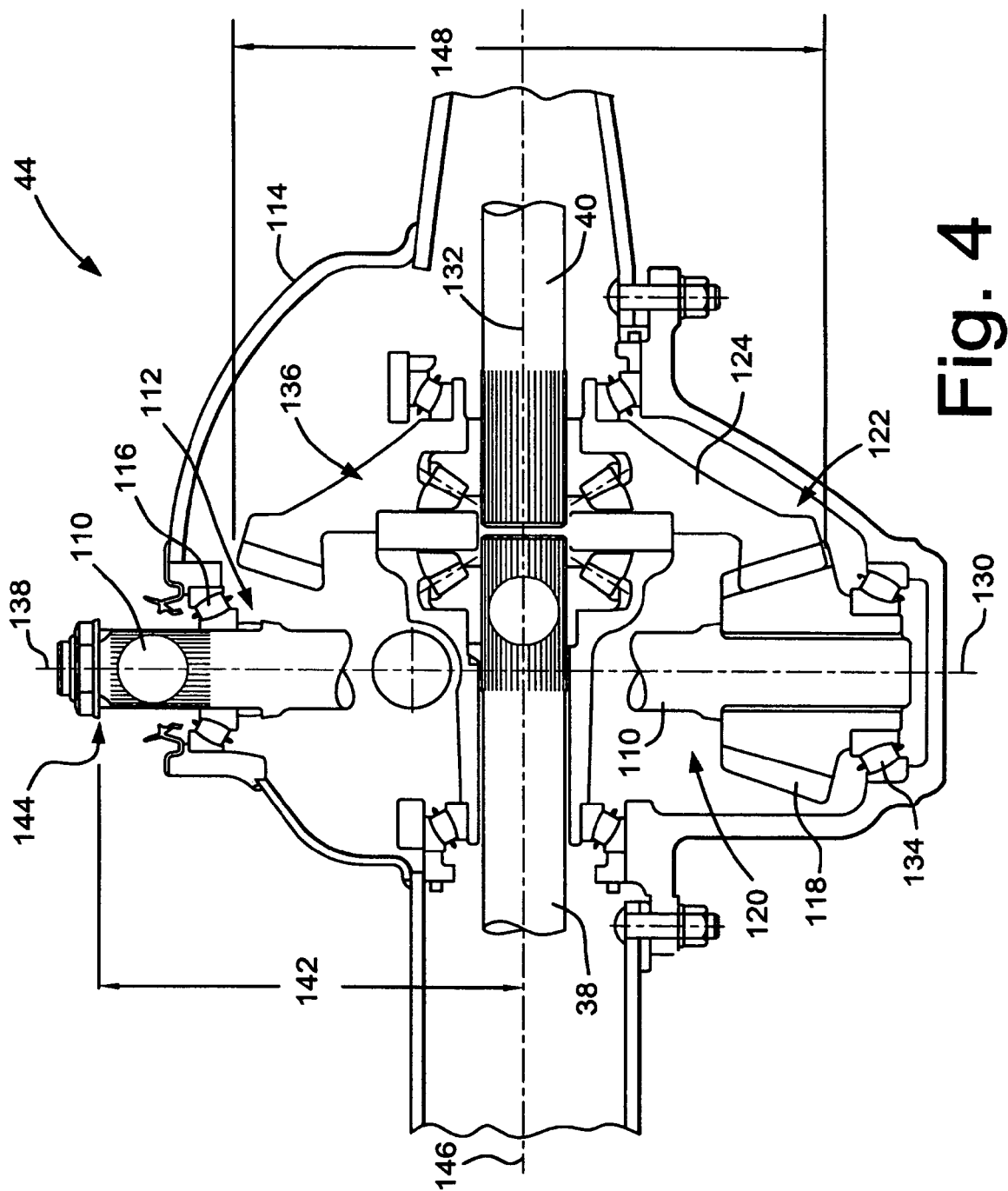
FIG. 4 is a schematic plan view of one embodiment of the rear drive axle system of the present invention.

The inter-axle driveline 36 is connected to an input shaft 110 for the rear drive axle assembly 44 with yoke 42, as seen in FIGS. 2 and 4. A forward portion 112 of the input shaft 110 is supported for rotation with respect to a rear drive axle assembly housing 114 with at least one bearing 116, as seen in FIG. 4.

Referring to both FIGS. 2 and 4, a rear pinion gear 118 is connected to a rearward portion 120 of the input shaft 110. Preferably, the rear pinion gear 118 is concentrically located about the input shaft 110 for rotation therewith. The rear pinion gear 118 is part of a rear hypoid gear set 122 also comprising a rear ring gear 124. The rear pinion gear 118 is drivingly connected to the rear ring gear 124. In the preferred embodiment best seen in FIG. 2, the rear pinion gear 118 is engaged with a drive side 126 of an upper, rear portion 128 of the ring gear 124. More specifically, an axis of rotation 130 of the rear pinion gear 118 is located above an axis of rotation 132 of the rear ring gear 124.

Those skilled in the art will appreciate that the drive side 126 of the rear ring gear 124 comprises convex ring gear teeth 129. Only a representative sample of convex ring gear teeth 129 are depicted in FIG. 2. Meshing the rear ring gear 124 with the convex ring gear teeth 129 on the drive side 126 of the rear ring gear 124 is a much stronger mesh than if the pinion gear 118 was meshed with the coast side of the gear 118.

As seen in FIG. 4, the rear pinion gear 118 and input shaft 110 are mounted for rotation with respect to the rear drive axle assembly housing 114 with a bearing 134.

The rear ring gear 124 is connected to a rear wheel differential 136 as shown in FIG. 4. The rear wheel differential 136 provides drive to the first and second rear drive axles 38, 40, as known by those skilled in the art.

The rear wheel differential 136 is preferably offset to one side of the input shaft 110 to allow the input shaft 110 to clear the rear wheel differential 136 and connect with the rear pinion gear 118.

Figure 5:
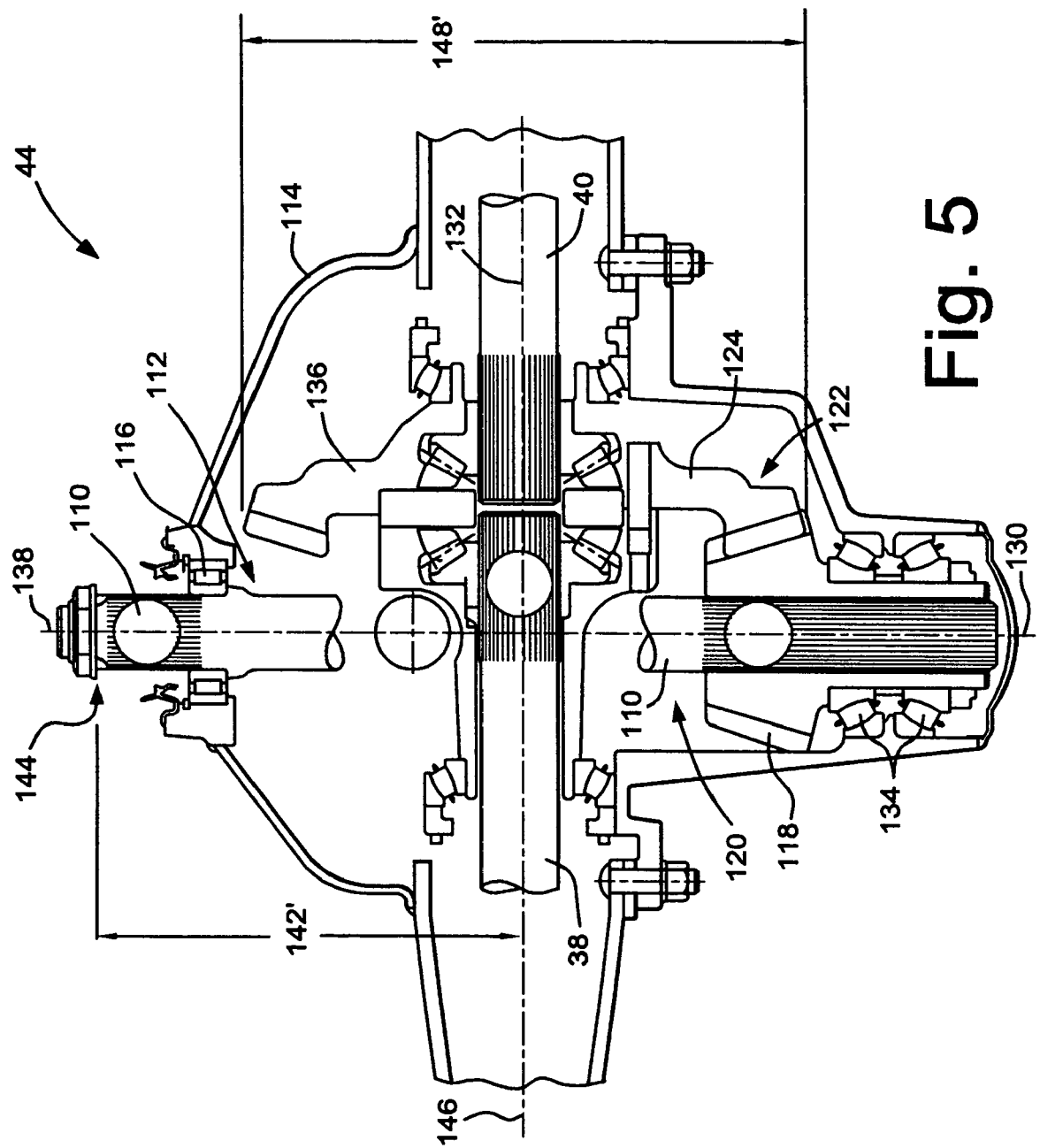
FIG. 5 is a schematic plan view of another embodiment of the rear drive axle system of the present invention.

FIG. 5 depicts an alternative embodiment of the present invention wherein the rear pinion gear 118 and the input shaft 110 are supported for rotation with respect to the rear drive axle assembly housing 114 with two bearings 134. Like reference numbers have been used in FIG. 5 for similar or identical components depicted in FIG. 4 and described above.

Regardless of the number of bearings used to support the rear pinion gear 118, and/or the input shaft 110, it is preferred that the rear output shaft 34 of the forward drive axle assembly 22, the inter-axle driveline 36 and the input shaft 110 of the rear drive axle assembly 44 substantially share a common, substantially straight, axis of rotation 138. In the preferred embodiment, an angle 140 between the rear output shaft 34, the inter-axle driveline 36 and the input shaft 110 is between zero degrees and ±three degrees. In a most preferred embodiment, the angle 140 is zero degrees.

The rear drive axle assemblies 44 depicted in FIGS. 4 or 5 also advantageously have a reduced standout dimension 142, 142' as compared to other known designs. Note that FIG. 5 may have a slightly different standout dimension 142' than the dimension 142 depicted in FIG. 4. Those skilled in the art know that the standout dimension is typically defined as the distance between a front portion 144 of the input shaft 110 and a centerline 146 of the axle shaft 38 or 40. Based on the capacity requirements for the rear drive axle assembly 44, standout dimensions will vary between assemblies. For example, the larger the capacity of the assembly, the larger the standout dimension. Note that for a prior art rear drive axle assembly of a particular capacity, a rear drive axle assembly 44 of the design of the present invention having the same capacity will have a smaller standout dimension.

For example, the standout dimension for a prior art rear drive axle assembly might be between approximately 85% to 95% of the of the ring gear diameter 148, 148'. The standout dimension 142, 142' for a rear drive axle assembly 44 of the present invention, however, is between approximately 70% to 80% of the ring gear diameter 148, 148'. Preferably, the standout dimension 142, 142' for a rear drive axle assembly 44 of the present invention, is approximately 72% to 75% of the ring gear diameter 148, 148'.

The inter-axle driveline 36 is thus optimized to reduce or eliminate the vertical distance between the yoke 98 shared by the through shaft 34 of the forward drive axle assembly 22 and the inter-axle driveline 36 and the yoke 42 shared by the input shaft 110 of the rear drive axle assembly 44 and the inter-axle driveline 36. Additionally, the yoke 42 shared by the input shaft 110 of the rear drive axle assembly 44 and the inter-axle driveline 36 is higher than those of the prior art thus advantageously providing a high ground clearance.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tandem axle system, comprising:
    a forward drive axle assembly having a forward hypoid gear set comprising a forward pinion gear drivingly connected to a drive side of a forward portion of a forward ring gear, said forward pinion gear being located below and forward of an axis of rotation of said forward ring gear;
    a rear drive axle assembly having a rear hypoid gear set comprising a rear pinion gear drivingly connected to a drive side of a rear portion of a rear ring gear, said rear pinion gear being located above and rearward of an axis of rotation of said rear ring gear; and
    an inter-axle driveline connecting said forward drive axle assembly with said rear drive axle assembly.

2. The system of claim 1, wherein said rear pinion gear is mounted for rotation within said rear drive axle assembly on one bearing.

3. The system of claim 1, wherein said rear pinion gear is mounted for rotation within said rear drive axle assembly on two bearings.

4. The system of claim 1, wherein said forward drive axle assembly has an inter-axle differential and a rear output shaft drivingly connected to said inter-axle differential and said rear drive axle assembly has a rear input shaft drivingly connected to a wheel differential, wherein said rear output shaft, said inter-axle driveline and said rear input shaft substantially share a common axis of rotation.

5. The system of claim 4, wherein the angle between said through shaft, said inter-axle driveline and said rear input shaft is approximately zero degrees.

6. The system of claim 4, wherein said rear pinion gear is concentrically mounted to said rear input shaft of said rear drive axle assembly.

7. The system of claim 1, wherein a standout dimension of said rear drive axle assembly is between approximately 70% to 80% of the ring gear diameter.

8. The system of claim 1, wherein a standout dimension of said rear drive axle assembly is between approximately 72% to 75% of the ring gear diameter.

9. The system of claim 4, wherein said inter-axle driveline is substantially above said axis of rotation of said forward ring gear and said axis of rotation of said rear ring gear.

10. The system of claim 4, wherein said rear pinion gear is rotatively driven and at least partially supported by said rear input shaft, said rear input shaft being separate from said rear pinion gear.

11. A tandem axle system, comprising:
    a forward drive axle assembly comprising an inter-axle differential, a rear output shaft drivingly connected to said inter-axle differential and a forward hypoid gear set comprising a forward pinion gear drivingly connected to a drive side of a forward portion of a forward ring gear, said forward pinion gear being located below and forward of an axis of rotation of said forward ring gear;
    a rear drive axle assembly comprising a rear input shaft and a rear hypoid gear set comprising a rear pinion gear drivingly connected to a drive side of a rear portion of a rear ring gear, said rear pinion gear being located above and rearward of an axis of rotation of said rear ring gear; and
    an inter-axle driveline drivingly connected to said rear output shaft and said input shaft, wherein said inter-axle driveline, said rear output shaft and said rear input shaft substantially share a common axis of rotation and said rear pinion gear is concentrically mounted on said rear input shaft for rotation therewith.

12. The system of claim 11, wherein the angle between said through shaft, said inter-axle driveline and said rear input shaft is approximately zero degrees.

13. The system of claim 11, wherein a standout dimension of said rear drive axle assembly is between approximately 72% to 75% of the ring gear diameter.

14. The system of claim 11, wherein said rear pinion gear is rotatively driven and at least partially supported by said rear input shaft, said rear input shaft being separate from said rear pinion gear.

15. The system of claim 11, wherein said forward pinion gear is meshed with convex ring gear teeth on said forward ring gear and said rear pinion gear is meshed with convex ring gear teeth on said rear ring gear.

* * * * *